United States Patent
Hamon et al.

(10) Patent No.: US 10,681,916 B2
(45) Date of Patent: Jun. 16, 2020

(54) DEVICE FOR FORMING A SHEETED DOUGH FROM A DOUGH PIECE BY PRESSING

(71) Applicant: EKIM, Montevrain (FR)

(72) Inventors: Cyrill Hamon, Montevrain (FR); Sébastien Roverso, Bussy-Saint-Georges (FR); Faustine Calvarin, Emerainville (FR)

(73) Assignee: EKIM, Montevrain (FR)

( * ) Notice: Subject to any disclaimer, the term of this patent is extended or adjusted under 35 U.S.C. 154(b) by 0 days.

(21) Appl. No.: 16/074,741

(22) PCT Filed: Feb. 2, 2017

(86) PCT No.: PCT/EP2017/052230
§ 371 (c)(1),
(2) Date: Aug. 1, 2018

(87) PCT Pub. No.: WO2017/134150
PCT Pub. Date: Aug. 10, 2017

(65) Prior Publication Data
US 2019/0037859 A1    Feb. 7, 2019

(30) Foreign Application Priority Data

Feb. 3, 2016  (FR) ..................................... 16 50844

(51) Int. Cl.
*A21C 11/00*        (2006.01)
*A21C 14/00*        (2006.01)
(Continued)

(52) U.S. Cl.
CPC ............ *A21C 11/006* (2013.01); *A21C 11/00* (2013.01); *A21C 14/00* (2013.01); *A21D 13/41* (2017.01);
(Continued)

(58) Field of Classification Search
CPC ....... A21C 11/00; A21C 11/006; A21C 14/00; A21C 9/04; A21D 13/41; A21D 8/02; B29C 43/3607
See application file for complete search history.

(56) References Cited

U.S. PATENT DOCUMENTS 2,770,182 A * 11/1956 Jensen ................. A47J 37/0611
126/41 R
4,569,815 A *  2/1986 Rentz ................... A63H 33/001
264/310
(Continued)

FOREIGN PATENT DOCUMENTS

AU        763526 B2    7/2001
EP       2174549 A1    4/2010

OTHER PUBLICATIONS

French Search Report from French Patent Application No. 1650844, dated Oct. 26, 2016.
(Continued)

*Primary Examiner* — Steven N Leff
(74) *Attorney, Agent, or Firm* — Greer, Burns & Crain, Ltd.

(57) ABSTRACT

A device for forming a sheeted dough from a dough piece, which includes: (i) a lower tray arranged so as to support the dough piece during a forming operation, (ii) an upper tray, and (iii) a forming actuator arranged so as to move the upper plate in relation to the lower plate, in such a way as to be able to press the dough piece between the lower tray and the upper tray in order to form a sheeted dough, the lower tray containing a system of mobile ejectors that can assume a so-called retracted position in such a way as to form, overall, a continuous surface with the lower tray, and a so-called raised position in such a way as to form a raised surface in relation to the lower tray.

14 Claims, 8 Drawing Sheets

(51) Int. Cl.
  *A21D 13/41* (2017.01)
  *A21C 9/04* (2006.01)
  *A21D 8/02* (2006.01)
  *B29C 43/36* (2006.01)

(52) U.S. Cl.
  CPC .................. *A21C 9/04* (2013.01); *A21D 8/02* (2013.01); *B29C 43/3607* (2013.01)

(56) References Cited

U.S. PATENT DOCUMENTS

| | | | | |
|---|---|---|---|---|
| 4,715,357 A * | 12/1987 | Sherman | .............. | A47J 37/0611 126/39 H |
| 5,070,775 A * | 12/1991 | Blake | ................... | A47J 37/0611 228/177 |
| 5,170,696 A * | 12/1992 | Reed | ....................... | A47J 27/20 99/349 |
| 5,934,182 A * | 8/1999 | Harter | .................... | A47J 27/62 99/349 |
| 6,386,854 B1 * | 5/2002 | Guss | ....................... | A21C 9/066 425/193 |
| 9,210,946 B2 * | 12/2015 | Hoffman | ................ | A23N 15/02 |
| 2002/0022071 A1 | 2/2002 | Hansen | | |
| 2007/0178198 A1 | 8/2007 | Lichtenstein | | |
| 2011/0209661 A1 | 9/2011 | Fritz-Jung et al. | | |
| 2012/0185086 A1 | 7/2012 | Khatchadourian et al. | | |

OTHER PUBLICATIONS

International Search Report from International Patent Application No. PCT/EP2017/052230, dated May 2, 2017.

Written Opinion of the International Searching Authority from International Patent Application No. PCT/EP2017/052230, dated May 2, 2017.

* cited by examiner

DEVICE FOR FORMING A SHEETED DOUGH FROM A DOUGH PIECE BY PRESSING

BACKGROUND

The present invention relates to a device for forming a dough piece in order to obtain a sheeted dough. It also relates to an automated machine for preparing food products such as pizzas.

The field of the present invention is preparing farinaceous products used in the agri-food industry, and more particularly in the field of industrial or semi-artisanal pizzas.

The general principle of forming dough pieces in order to obtain a sheeted dough for preparing pizzas is already well known. The devices that implement this principle generally comprise a press inside which a dough piece is placed and then pressed in order to flatten it. The dough piece is held compressed between the two platens for a certain time before the two platens are separated again so that the sheeted dough shaped in this way can be extracted. In a known manner, the form of the sheeted dough is imparted, during the pressing operation, by the form of the platens between which the dough piece is pressed. Thus, a recess around the perimeter of one of the platens makes it possible both to impart the general form of the sheeted dough and to produce a peripheral rim on the dough during a single forming process.

The sheeted dough can be extracted from the forming device by inserting a flat peel between the sheeted dough and the lower platen on which it is resting. The use of a peel that is relatively thin compared to the thickness of the sheeted dough is generally required to enable the insertion of the peel below the sheeted dough, and to prevent the deformation of the sheeted dough. Despite this, the problems of adhesion between the flat peel and the sheeted dough during the operation to insert said flat peel below the sheeted dough persist, resulting in a high risk of tearing the dough and a loss of profitability. Despite numerous techniques implemented to limit the adhesion between the lower platen and the sheeted dough, for example through the use of particular materials or the addition of flour on the lower platen, tearing of the sheeted dough is still frequent. It is thus difficult to automate the step of extracting a sheeted dough after forming.

The object of the present invention is to overcome at least the majority of the problems set out above and also to lead to other advantages.

Another purpose of the invention is to solve at least one of these problems by means of a new device for forming sheeted dough from dough pieces.

Another purpose of the present invention is to improve the operating output of devices for forming. Another purpose of the present invention is to facilitate the operation to extract a sheeted dough from a device for forming dough pieces.

Another purpose of the present invention is to limit the causes of tearing during the extraction of the formed sheeted dough.

A further purpose of the present invention is to provide a device for forming a sheeted dough that has a simple design.

SUMMARY

According to a first aspect of the invention, at least one of the aforementioned purposes is achieved with the device for forming a sheeted dough from a dough piece, comprising (i) a lower platen, arranged to support the dough piece during a forming operation, (ii) an upper platen, and (iii) a forming actuator, arranged to generate a relative movement of the upper platen and the lower platen, so that the dough piece can be pressed between the lower platen and the upper platen to form a sheeted dough. The lower platen comprises:

a pressure plate having an upper surface suitable for receiving the dough piece, the pressure plate being equipped with a plurality of apertures formed in the upper surface thereof, a plurality of moveable elements, each moveable element engaging with one of the apertures in the pressure plate, the moveable elements being suitable for adopting:

a position known as retracted position, in which an upper surface of each moveable element is flush with the upper surface of the pressure plate, in such a way as to form, overall, a continuous surface with the pressure plate, and a position known as raised position, in which the moveable elements protrude with respect to the upper surface of the pressure plate, in such a way that the upper surfaces of each moveable element together form a raised surface with respect to the upper surface of the pressure plate, and a lifting device, arranged to move the moveable elements with respect to the pressure plate, in such a way that the moveable elements adopt the retracted position or the raised position.

In a comparable manner to the known forming devices, the present invention implements two platens that can be moved with respect to each other by means of at least one actuator arranged to apply pressure between said two platens. The at least one actuator can be arranged to move only one of the two platens, and preferably the upper platen, or alternatively, to move both platens, concomitantly or consecutively.

The forming device is arranged so that the upper and lower platens can engage during a pressing operation in order to impart the form of a sheeted dough to a dough piece. More precisely, the forming device is arranged so that in a position known as lowered position, the upper surface of the lower platen and the lower surface of the upper platen are in a relative position such that the dough piece is deformed with respect to its initial form. The lower and upper platens have for example a flat surface, a convex surface or a concave surface. The upper surface of the lower platen and the lower surface of the upper platen can have complementary forms. The distance between the upper surface of the lower platen and the lower surface of the upper platen can be constant or not. By way of non-limitative examples, the platens can both be flat, or one can be concave and the other convex, the radii of curvature of each surface being able to be equal.

The upper platen can contribute to the final forming of the sheeted dough. For example, the upper platen can comprise an annular recess formed on the lower surface thereof in order to allow the formation of a peripheral rim on the dough during the pressing operation. This annular recess can advantageously adopt a completely circular form in order to produce circular sheeted doughs. It can alternatively take a less regular form in order to simulate artisanal rolling out of the dough.

Ingeniously, the lower platen is no longer monolithic as is the case for the devices of the prior art. Instead, the lower platen according to the invention is made up of a pressure plate the upper surface of which, facing the upper platen, comprises a plurality of apertures, each aperture being arranged in the pressure plate along a guide line substantially perpendicular to the plane of the upper surface. In the event that the surface is not flat, the plane must be considered as the mean plane in the vicinity of the upper surface of the pressure plate. Each aperture opens out at least onto the upper surface of the pressure plate. It can also open out onto the lower surface of the pressure plate, opposite the upper surface. Within each aperture, a moveable element is accommodated and is capable of moving along said corresponding guide line. Thus, collectively, the plurality of moveable elements makes it possible, in a first configuration known as retracted configuration, to form a continuous surface similar to that obtained by a monolithic lower platen and, in a second configuration known as raised configuration, to form a discontinuous surface that extends locally beyond the upper surface of the pressure plate.

According to a first alternative, the distribution of the apertures made in the pressure plate and the equivalent distribution of the moveable elements engaging with said apertures can be even, so that said moveable elements define, in the raised configuration, a discontinuous surface supporting the sheeted dough in a plurality of contact zones distributed evenly below the surface of said sheeted dough. Advantageously, the apertures and the moveable elements are distributed evenly in two perpendicular directions of a plane parallel to a mean surface of the lower platen. It is thus possible to support the sheeted dough in an even manner and reduce the risks of tearing linked to sagging of a portion of dough between two moveable elements. The density of apertures made in the pressure plate, as well as the density of moveable elements engaging with said apertures, can thus be adjusted depending on the mechanical characteristics of the dough, and particularly its elasticity and its flexibility.

According to a second alternative, the distribution of the apertures made in the pressure plate and the distribution of the moveable elements engaging with said apertures can be uneven, with, for example, zones in which the densities of apertures and moveable elements are greater than in other zones. This uneven distribution can be established for example as a function of the weight of the portions of sheeted dough that are supported by each moveable element and/or as a function of the stretch resistance of said portions in order to reduce the risks of tearing. In fact, the portions of the sheeted dough that have an additional thickness, for example the peripheral rim, have a higher surface density than the portions of sheeted dough that only comprise a thin layer of rolled-out dough. Comparably, the portions of sheeted dough that are thinnest can be more fragile when they are subjected to stretching than the portions of dough that have an additional thickness.

By way of non-limitative example, in the raised configuration, the upper surface of the moveable elements can be situated between two millimetres and three centimetres from the upper surface of the pressure plate. The upper surface of the moveable elements is for example situated two centimetres from the upper surface of the pressure plate.

During a pressing operation, i.e. when the forming actuator brings the two platens towards each other, the moveable elements are all positioned in the retracted position in order to form a continuous contact surface with the upper surface of the pressure plate. Then, during an operation to extract the sheeted dough, the upper platen being positioned away from the lower platen, at least some of the moveable elements are moved towards the raised position in order to detach the sheeted dough from the upper surface of the pressure plate. It is then possible to introduce a peel between the sheeted dough raised in this way and the pressure plate, without contact, and therefore without friction, between said peel and said sheeted dough, thus reducing the risks of tearing. The peel is arranged so that it can be inserted between the moveable elements, depending on their layout on the pressure plate. It can for example adopt the form of a comb, each prong of the comb being accommodated between moveable elements.

The lower platen according to the invention makes it possible to facilitate the operation to extract the sheeted dough from the forming device, and in particular, to detach the sheeted dough from the lower platen without tearing. The sheeted dough is detached in two separate steps: (1) detachment of the dough from the pressure plate when the moveable elements are raised and (2) detachment of the sheeted dough from the moveable elements when the peel (inserted below) grips the sheeted dough while raising it.

Optionally, the sheeted dough can be detached from the moveable elements by combining a movement to retract said moveable elements towards the lower platen and an opposite movement of the peel, inserted below the sheeted dough, towards the upper platen.

Alternatively, the sheeted dough can be detached from the moveable elements by completely retracting the moveable elements towards the lower platen, with the peel inserted below the sheeted dough.

The first aspect of the present invention thus makes it possible to improve the operating output of devices for forming dough pieces, by reducing the number of sheeted doughs torn during the extraction thereof.

According to a first embodiment, the lifting device makes it possible to move the moveable elements simultaneously and collectively, all of the moveable elements being driven by a single movement. In this embodiment, all of the moveable elements can be moved by a single actuator connected to each moveable element by a plurality of transmission members in order to propagate the movement generated by the actuator to each moveable element. The moveable elements can alternatively all be fixed to a single holder, driven by the actuator.

According to a second embodiment, the lifting device makes it possible to move all of the moveable elements individually. In this second embodiment, each moveable element can preferably be moved by a separate actuator, each actuator being capable of being controlled independently of the other actuators.

Optionally, once the pressing operation has been performed and before the moveable elements are fully extended to detach the sheeted dough, the lifting device according to the second embodiment can control each moveable element in a plurality of low amplitude back-and-forth movements in order to facilitate the detachment of the sheeted dough from the upper surface of the pressure plate. It is thus possible to at least partially detach the portions of sheeted dough situated between two moveable elements by subjecting said portions of sheeted dough to reduced stretching in the event of adhesion, and therefore limit the risks of tearing. The repetition of the back-and-forth movements ultimately makes it possible to completely detach the sheeted dough from the pressure plate.

Once the dough has been formed, it is necessary, firstly, to reduce the surface area in contact with the pressure plate as much as possible, while reducing the risks of tearing during the detachment operation, and ensuring a degree of support of the sheeted dough on the moveable elements. Secondly, it is also necessary to ensure easy detachment of the sheeted dough supported by the moveable elements in the raised configuration.

The detachment of the sheeted dough from the pressure plate on the one hand, and the moveable elements on the other hand, requires that a compromise be found regarding the sizing and distribution of the moveable elements. More precisely, a compromise must be found regarding the surface area covered by all of the moveable elements and/or the layout thereof with respect to the upper surface of the lower platen.

Thus, in the forming device according to the first aspect of the invention, the sum of the upper surface areas of the moveable elements is at least greater than or equal to 4% of the total surface area of the pressure plate. In the remainder of the document, the sum of the upper surface areas of the moveable elements will be referred to as the fractional surface area. By total surface area is meant the surface area of the pressure plate including the surface area of the apertures arranged in the pressure plate. Such a proportion makes it possible to limit the slumping of the sheeted dough between the moveable elements, and to limit the adhesion of the dough to the moveable elements during detachment by the peel.

With just 4% of the surface area of the sheeted dough supported by all or some of the moveable elements, the sheeted dough is supported by a minimum number of points of support. This configuration is obviously the most cost-effective to manufacture as it implements a minimum number of moveable elements. However, it results in greater internal tension of the portions of sheeted dough that are situated between two consecutive moveable elements.

At the same time, the fractional surface area is preferably less than or equal to 96% of the total surface area of the pressure plate. Such a proportion makes it possible to support the sheeted dough in the raised configuration with a maximum contact surface area, therefore reducing the stretching of the sheeted dough between two moveable elements and thus limiting the risks of tearing, while also making it possible to insert a peel between the moveable elements in order to remove said sheeted dough.

An optimum configuration involves a fractional surface area comprised between 15% and 30% of the total area of the pressure plate. The fractional area is for example equal to 20% of the total area of the pressure plate.

According to a first embodiment of the forming device according to any one of the improvements of the first aspect of the invention, the upper surfaces of the moveable elements together form a connected surface. In other words, the upper surface of the moveable elements forms a continuous surface.

Alternatively, according to a second embodiment of the forming device according to any one of the improvements of the first aspect of the invention, the upper surfaces of the moveable elements together form a disconnected surface, each moveable element being evenly spaced from the nearest neighbouring moveable element in at least one direction. The upper surfaces of the moveable elements thus form a discontinuous surface.

This configuration ingeniously makes it possible to reduce the clogging of the moveable elements and/or of the plurality of corresponding apertures in the pressure plate. In addition, the moveable elements can then all be identical and it is therefore possible to reduce the associated manufacturing costs.

Advantageously, each moveable element of a forming device according to any one of the improvements of the first aspect of the invention comprises a moveable stud arranged inside one of the apertures of the pressure plate, the studs being moveable in translation along an axis perpendicular to the upper surface of said pressure plate.

According to a particular embodiment, the studs can adopt the form of cylindrical studs with a circular cross-section. Such parts can be manufactured with low tolerances at a moderate cost compared to more complex parts. Alternatively, the studs can also take the form of a cylinder with a non-circular cross-section, for example a square or polygonal cross-section.

As mentioned above, the moveable elements can be distributed in a plurality of configurations depending on the objectives sought. Optionally, the studs can be distributed in a regular, periodic two-dimensional grid of rows and columns. It is thus possible to insert a comb-shaped peel in order to remove the sheeted dough supported by said studs when they are in the raised position. This advantageous distribution ingeniously makes it possible to insert the peel between the studs along any one of the guide axes of said two-dimensional grid. Depending on the use, and in particular in the context of automated processing of the forming and/or removal of the dough thus formed, the option of inserting the peel in several directions can make it possible to improve output.

Such a peel compatible with such a two-dimensional grid of studs evenly spaced in a plurality of rows and columns comprises a plurality of prongs, ideally in the same number as the number of rows or columns of said grid, each prong being made from a parallelepipedal bar the width of which is smaller than the spacing of the grid and the height of which is smaller than the height of the studs in their raised position, so that said peel can be introduced between the studs and below the sheeted dough, without friction.

Also alternatively, the moveable elements can adopt the form of elongated structures such as a grid of bars for example, extending transversely with respect to the pressure plate. In this case, the peel used to withdraw the sheeted dough from the forming device can also be in the form of a comb. However, the insertion of the peel below the sheeted dough is only possible in a direction parallel to the direction of elongation of the bars.

In a particular manner, in a forming device according to any one of the improvements of the first aspect of the invention, the lower platen is arranged so that there is clearance between the moveable stud of each moveable element and the corresponding aperture of the pressure plate. This clearance is determined on the one hand, so that the moveable elements can move between the retracted and raised positions, and on the other hand to prevent part of the dough piece from becoming inserted between the moveable elements and the pressure plate. The clearance is for example between 15 μm and 40 μm.

More generally, the lower platen is arranged to ensure the existence of a minimum clearance between the studs and the apertures with which they engage in order to allow unrestricted sliding despite the thermal expansion of the various elements (pressure plate and moveable elements) and to prevent the dough entering therein during the forming operation.

Preferentially, the lifting device of a forming device according to any one of the improvements of the first aspect of the invention comprises, alone or in combination:
  a support plate on which the moveable elements are mounted, and an actuator arranged to move the support plate such that the moveable elements can successively adopt the retracted position and the raised position. Advantageously, the moveable elements can be mounted with clearance in the plane of the support plate in order to relieve the mechanical stresses, particularly due to thermal expansion, on the positioning of said moveable elements on the support plate. By way of example, the clearance can be of the order of one millimetre in the plane of the support plate, i.e. in a plane transverse to the vertical direction. Alternatively, the moveable elements can be secured to the support plate;

a first heating means arranged to heat the upper platen, in order to precook the sheeted dough, limit the adhesion thereof to said upper platen, and/or limit the retraction thereof when the upper and lower platens are no longer pressed together;

a second heating means arranged to heat the lower platen, in order to precook the sheeted dough, facilitate the detachment thereof from said lower platen, and/or limit the retraction thereof when the upper and lower platens are no longer pressed together.

The device for forming a sheeted dough can comprise a device for adjusting the size of the sheeted dough, said device comprising:

storage means arranged to store a plurality of upper platens, each upper platen having on a lower surface thereof a recess of a predetermined size, a loading mechanism arranged to move one of the upper platens between the storage means and a position in which is it attached to the forming actuator.

Advantageously, in a forming device according to any one of the improvements of the first aspect of the invention, the upper platen and/or the lower platen comprise a material having a thermal conductivity greater than or equal to 50 W/m·K or 100 W/m·K. This can be for example aluminium, an aluminium alloy, or copper. Such a material makes it possible in particular for the temperature of said upper and/or lower platen to be as even as possible and for the heat transfer to the dough to be as efficient as possible.

Preferentially, the upper platen and/or lower platen of a forming device according to any one of the improvements of the first aspect of the invention comprise a non-stick coating at least on their facing surfaces, i.e. the lower surface of the upper platen and the upper surface of the lower platen (pressure plate and moveable elements).

According to a second aspect of the invention, the use of the forming device according to any one of the improvements of the first aspect of the invention is proposed for pressing a dough piece of the pizza dough type in order to form a sheeted dough.

According to a third aspect of the invention, an automated machine for preparing at least one pizza is proposed, comprising:

a system for preserving and metering ingredients, said ingredients being suitable for use in preparing pizzas;

a device for forming a sheeted dough according to any one of the improvements of the first aspect of the invention;

a cooking oven, arranged to cook at least one pizza;

a handling system arranged to transfer at least one of the pizzas between the preservation and metering system, the forming device and the oven;

a processing unit programmed to control the automated machine so as to prepare the at least one pizza according to a predetermined recipe.

Various embodiments of the invention are envisaged, incorporating the different optional features set out herein according to all of the possible combinations thereof.

BRIEF DESCRIPTION OF THE DRAWINGS

Other advantages and characteristics of the invention will become apparent from the following description and from several embodiments given by way of non-limitative example with reference to the attached diagrammatic drawings, in which.

DETAILED DESCRIPTION

The embodiments which will be described below are in no way limitative; it is possible in particular to imagine variants of the invention comprising only a selection of characteristics described below in isolation from the other characteristics described, if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

In particular, all the variants and all the embodiments described can be combined together if there is no objection to this combination from a technical point of view.

In the figures, the elements common to several figures retain the same reference.

Figure 1A:
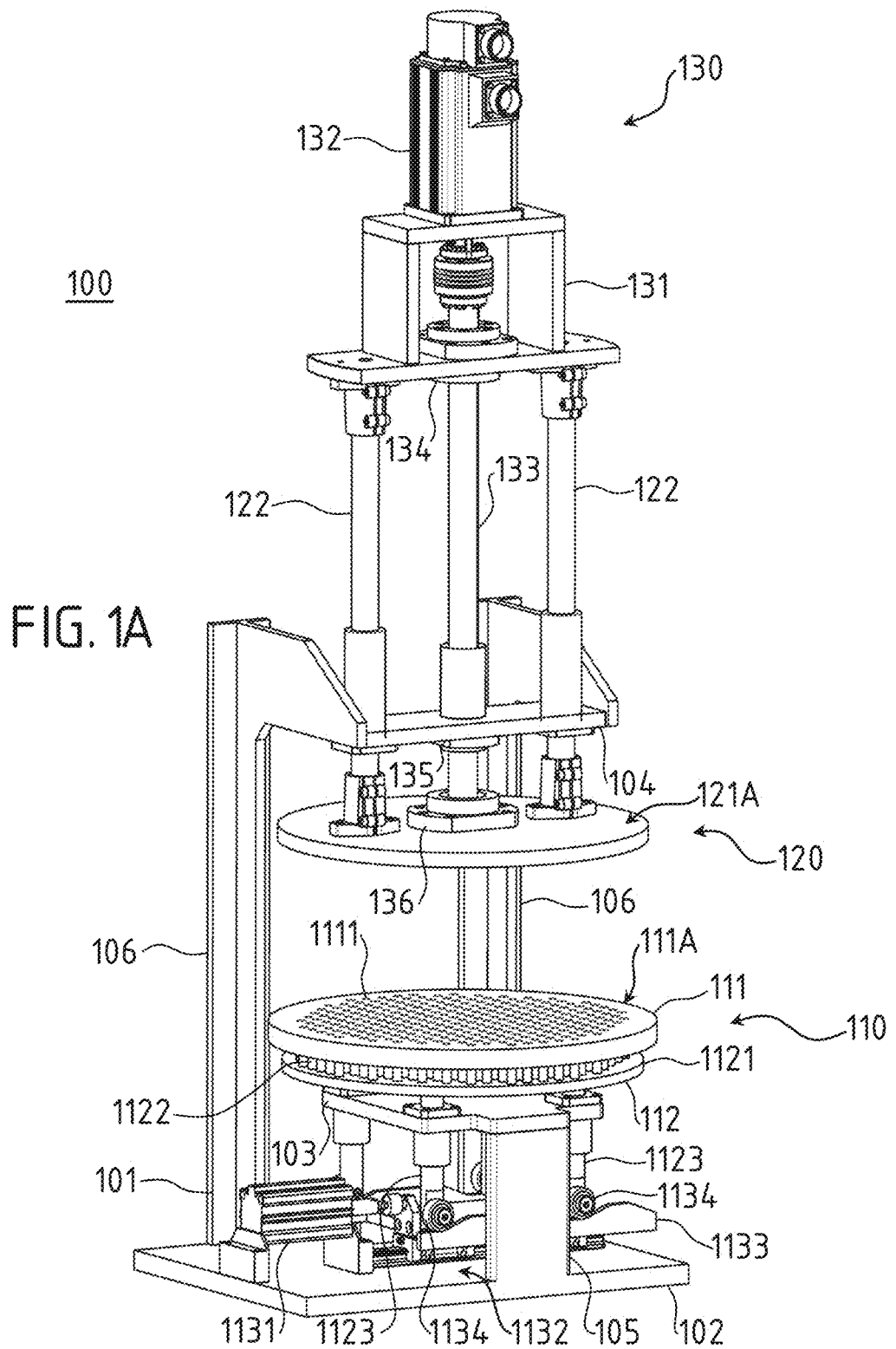
FIG. 1A shows a perspective view of the forming device according to the invention.

With reference to FIG. 1A, the forming device 100 according to the invention comprises a frame 101, a lower platen 110, an upper platen 120, and a forming actuator 130. The frame 101 comprises a base 102, a first platform 103, and a second platform 104. The platform 103 is fixed in a raised position with respect to the base 102 by lateral uprights 105. It forms a support for the lower platen 110. The platform 104 is fixed in a raised position with respect to the first platform 103 by posts 106 secured to the base 102. The platform 104 forms a support for the upper platen 120.

The lower platen 110 is arranged to receive a dough piece and form a support for this dough piece during a forming operation. It comprises a pressure plate 111, an ejector plate 112 and a lifting device 113. The pressure plate 111 has an upper surface 111A suitable for receiving the dough piece. It comprises a plurality of through apertures 1111 extending through the thickness thereof. The pressure plate 111 is secured to the first platform 103 by means that are not shown. The ejector plate 112 comprises a support plate 1121 and a plurality of studs 1122 extending vertically from an upper surface 112A of the support plate 1121. The studs 1122 have a cylindrical form here. They are aligned with respect to each other in a grid of rows and columns. The ejector plate 112 is mounted in slidable connection with respect to the frame 101, by means of four guide shafts 1123 each mounted in pivoting, slidable connection on the first platform 103. A first end of the guide shafts 1123 is fixed to the support plate 1121. The lifting device 113 is arranged to move the ejector plate 112 with respect to the frame 101, and therefore with respect to the pressure plate 111. It comprises a jack 1131 the body of which is fixed to the base 102, and a motion conversion mechanism 1132 arranged to convert a horizontal translational motion into a vertical translational motion. The motion conversion mechanism 1132 comprises two guide parts 1133 and four rollers 1134. The rollers 1134 are in pivoting connection with the guide shafts 1123 of the ejector plate 112 along first horizontal axes, parallel to each other. The guide parts 1133 are in sliding connection with the base 102 along a second horizontal axis, perpendicular to the first horizontal axes. They each comprise a running surface on which one of the rollers 1134 can run. The running surfaces extend along third horizontal axes, parallel to the second horizontal axis, and have a variable profile in the vertical direction, so that the running of the rollers results in places in a vertical movement of these rollers, and therefore of the ejector plate 112 with its studs 1122. A free end of the piston of the jack 1131 is fixed to the guide parts 1133. The jack 1131 is arranged to move the guide parts 1133 along the second horizontal axis. The lower platen 110 thus allows the studs 1122 to successively adopt a retracted position, in which the upper surface thereof is flush with the upper surface 111A of the pressure plate 111, and a raised position, in which they protrude with respect to the pressure plate 111.

The upper platen 120 is arranged so that it can move vertically in translation, in such a way as to flatten a dough piece situated on the lower platen 110. It comprises a plate 121, and two linear guide shafts 122 extending vertically from an upper surface 121A of the plate 121. The linear guide shafts 122 are each in sliding connection with the second platform 104 along a vertical axis. As a result, the upper platen 120 is in sliding connection along a vertical axis.

The forming actuator 130 is arranged to drive the movement of the upper platen 120 with respect to the frame 101 between a position known as extended position, in which the upper platen 120 is sufficiently close to the lower platen 110 to allow the pressing of a dough piece, and a position known as withdrawn position, in which the upper platen 120 is far enough away from the lower platen 110 to allow the insertion of a dough piece, and the removal of a sheeted dough. The forming actuator 130 comprises a fixing frame 131, a motor 132 and a driving screw 133. The fixing frame 131 is fixed to the pistons 122. The motor 132 comprises a shaft capable of rotating along a vertical axis of rotation. The driving screw 133 is rotatably secured to the shaft of the motor 132. It could also be connected to the shaft by a reduction gear. The driving screw 133 is in pivoting connection with the fixing frame 131 by means of a ball bearing 134, in helical connection with the second platform 104 by means of a nut 135 integral with the second platform 104, and in pivoting connection with the upper platen 120 by means of a ball bearing 136. The axis of these three connections is the vertical axis of rotation of the motor 132.

In an alternative embodiment, the forming actuator could comprise one or more jacks integral with the second platform 104, a piston of each jack being fixed to the upper platen 120.

Figure 1B:
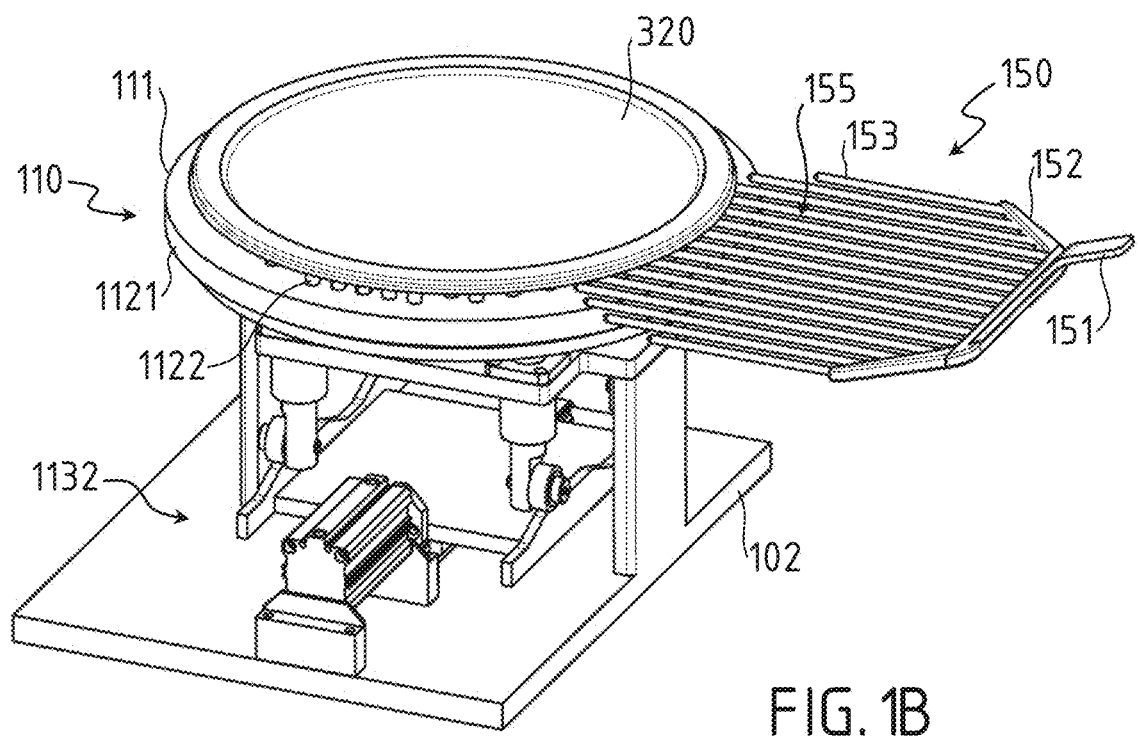
FIG. 1B shows a perspective view of a peel arranged to extract a dough sheeted by the forming device according to the invention, said peel engaging with said forming device.

FIG. 1B shows a perspective view of a peel 150 arranged to extract a sheeted dough 320 formed by the forming device 100 according to the invention, said peel 150 engaging with said forming device 100.

More particularly, the peel 150 comprises a straight first end 151 forming a handle at the end of which a convex frame 152 extends. The peel 150 also comprises a so-called removal surface 155 formed by a two-dimensional comb extending from the convex frame 152. The comb comprises a plurality of prongs 153, for example in the form of straight bars, extending in parallel directions. The distance between two adjacent prongs is constant and preferably identical to the distance between two adjacent moveable elements on the support plate 1121 of the lower platen 110. In addition, the width of each prong 153 is smaller than the space left free between two adjacent moveable elements, in such a way as to allow the comb to be inserted laterally between the moveable elements of the lower platen.

The thickness of all of the prongs 153 is preferably constant. The thickness of the prongs 153 is preferably slightly smaller than the height of the moveable elements 1122 with respect to the pressure plate 111 when they are in their raised position as described in FIG. 6, so that it is possible to insert the peel 150 between the pressure plate 111 and the sheeted dough 320, each prong 153 of the peel 150 being inserted between two consecutive rows of moveable elements 1122.

Figure 2A:
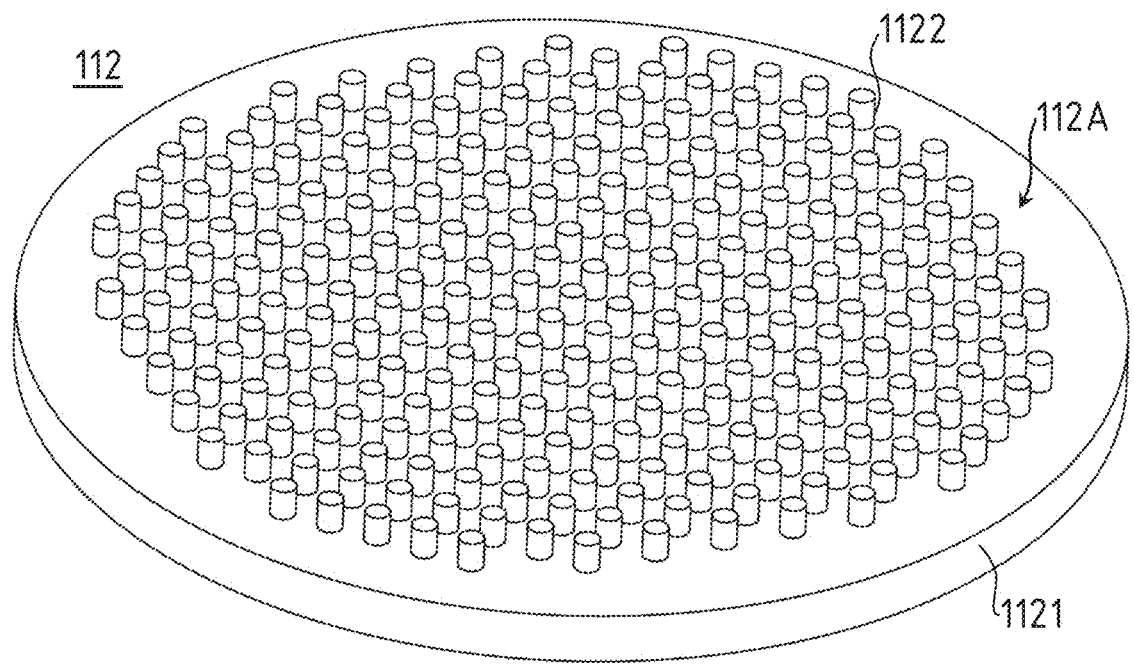
FIGS. 2A and 2B show two different embodiments of the lower platen, and more particularly two particular moveable element layouts.
Figure 2B:
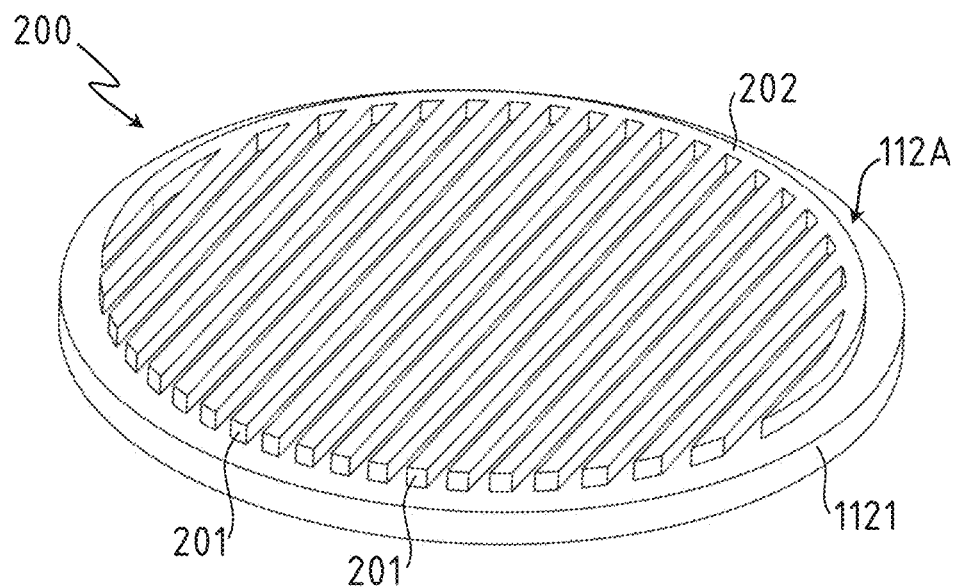

FIGS. 2A and 2B describe two different embodiments of the lower platen 110, and more particularly two particular moveable element layouts on the surface of the support plate 1121.

In the first embodiment (FIG. 2A), the moveable elements implemented form a disconnected surface. The moveable elements are made up of a grid of identical cylindrical studs 1122 with a circular cross-section. They are organized in a regular, periodic layout in both directions of the plane formed by the upper surface 112A of the support plate 1121. For such an embodiment, the pressure plate 111 (not shown) has a grid of apertures in an identical layout to the grid of moveable elements shown in FIG. 2A. The studs typically have a diameter of the order of 10 mm. In addition, the sizing of the pressure plate and the positioning of the moveable elements with respect to said pressure plate are arranged to ensure the existence of minimum clearance between the studs and the apertures with which they engage in order to allow unrestricted sliding despite the thermal expansion of the various elements (pressure plate and moveable elements) and to prevent the dough from entering therein during the pressing operation.

Typically, the different moveable elements are positioned with respect to the pressure plate with a tolerance of the order of one hundredth of a millimetre, and the clearance between each moveable element and the aperture of the pressure plate with which it engages is of the order of 30 µm.

In the second embodiment (FIG. 2B), the moveable elements implemented form a connected surface. The moveable elements adopt the form of a two-dimensional comb protruding with respect to the upper surface 112A of the support plate 1121. The comb 200 comprises a plurality of prongs 201 in the form of straight bars extending in parallel horizontal directions, and a peripheral rim portion 202 connecting the prongs 201. The connection of the upper surface of the moveable elements is provided by the peripheral rim 202.

Comparably to the embodiment described above with reference to FIG. 2A, the pressure plate 111 (not shown) has an aperture the geometry of which is complementary to the shape of the prongs 202, so that the prongs can slide freely inside this aperture. In addition, the sizing of the pressure plate and the positioning of the moveable elements with respect to said pressure plate are arranged to ensure the existence of minimum clearance between the studs and the apertures with which they engage, despite the thermal expansion of the various elements (pressure plate and moveable elements) and to prevent the dough from entering therein during the pressing operation.

Figure 2C:
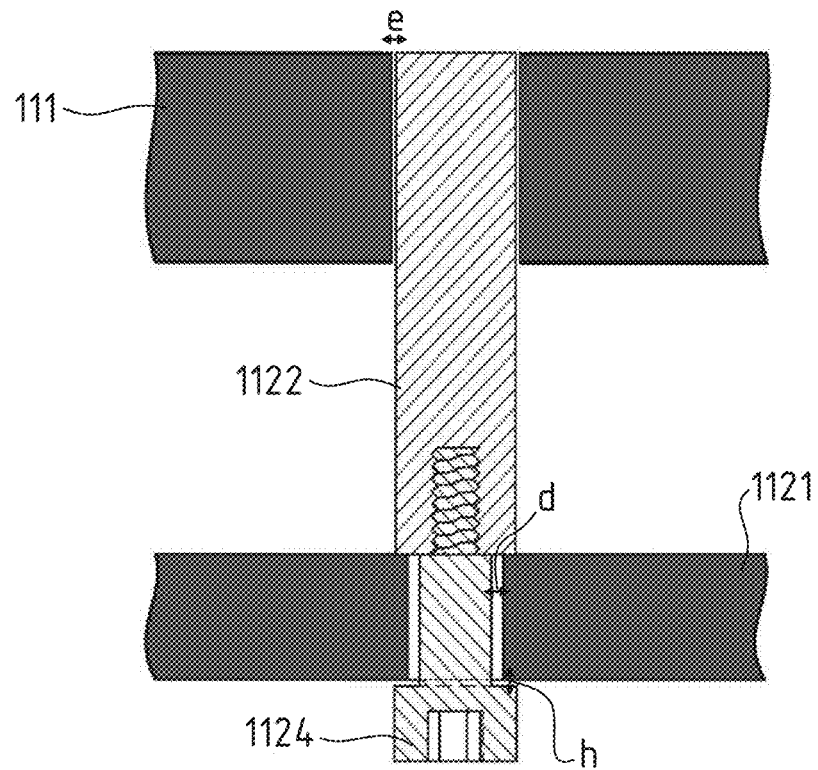
FIG. 2C shows a detailed view of the assembly of the moveable elements inside the lower platen, in such a way as to show the clearances that make it possible to overcome the stresses linked to the thermal expansion differences between the elements of said lower platen, FIGS. 3, 4, 5 and 6 respectively show the first, second, third and fourth steps of the method for forming a sheeted dough from a dough piece, using a device according to the present invention.

FIG. 2C shows a detailed view of the assembly of a moveable element inside the lower platen, in such a way as to show the clearances that make it possible to overcome the stresses linked to the thermal expansion differences between the elements of said lower platen.

On the example shown in FIG. 2C, the moveable element 1122 is mounted on the support plate 1121 of the lower platen with very little vertical clearance h, of the order of several tenths of a micron. This clearance makes it possible to correct any misalignment of the axis of the moveable element 1122 with the axis of the aperture 1111 arranged in the pressure plate 111. The lateral clearance d is larger, of the order of one millimetre, so that the thermal expansion differences between each moveable element 1122, the support plate 1121 and the pressure plate 111 do not prevent each moveable element from sliding inside the through aperture 1111 made to this end in the pressure plate 111 as described in detail above. In other words, the vertical and transverse clearances on the support plate 1121 are such that they allow each moveable element 1122 to align automatically with the corresponding through-hole in the pressure plate 111, despite any thermal expansion differences between these elements.

On the pressure plate 111, minimum clearance is provided in such a way as to allow the moveable element to slide while preventing chilled dough from becoming inserted inside said through-hole.

On the example shown in FIG. 2C, the moveable element 1122 is mounted on the support plate 1121 by means of a screw 1124.

The forming method using the forming device according to the invention will now be described with reference to FIGS. 3, 4, 5 and 6, which show the forming device in profile cross-sectional views in different configurations.

Figure 3:
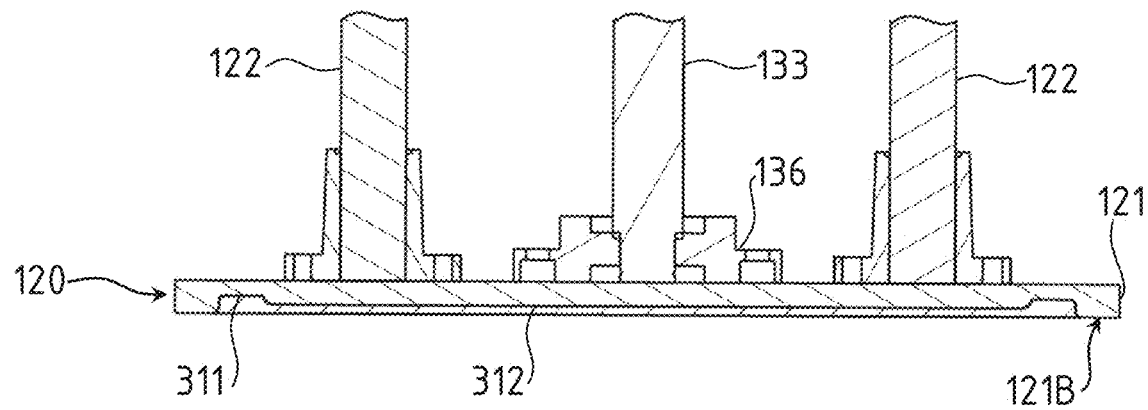
Figure 3:
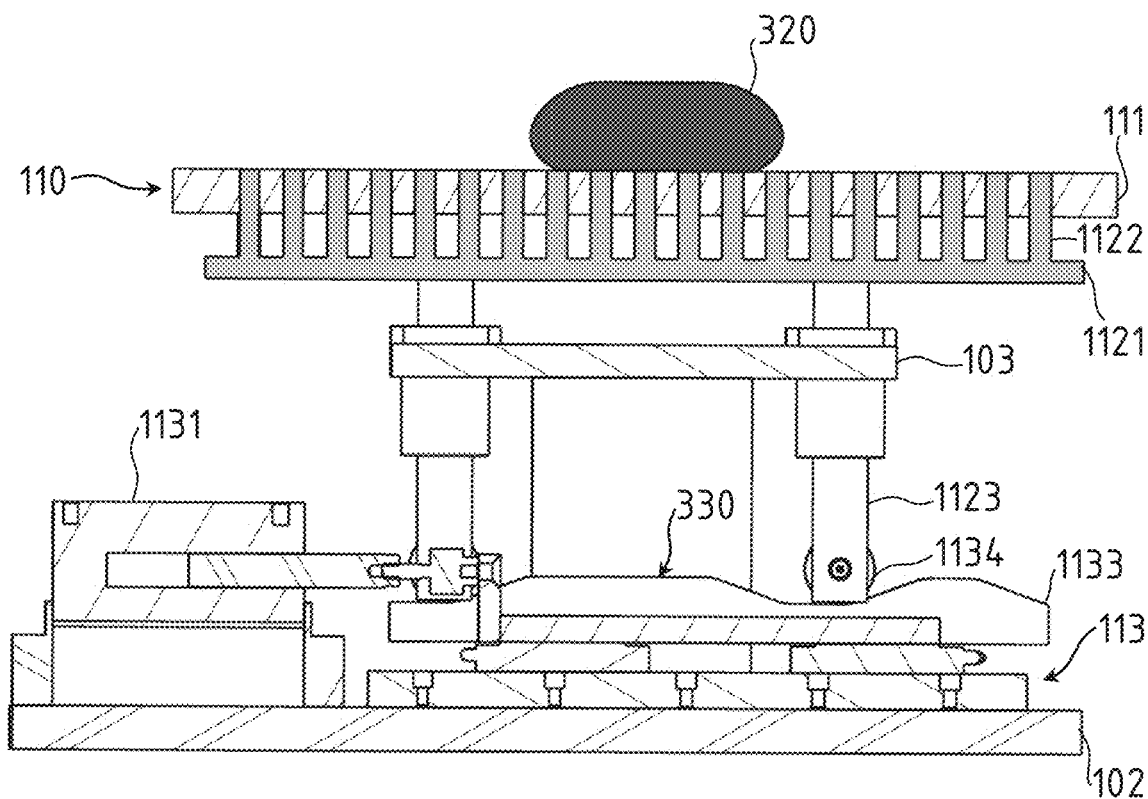

During the first step of the method shown diagrammatically in FIG. 3, the lower platen 110 is far enough away from the upper platen 120 to allow the insertion of a dough piece 320. The dough piece is preferably placed at the centre of the pressure plate 111. The moveable elements supported here by the support plate 1121 are placed in the retracted configuration in order to form a flat surface with the pressure plate 111. To this end, the jack 1131 is actuated to position the rollers 1134 in a recess of the running surfaces 330.

It can also be seen in this figure that the upper platen 120 comprises a sunken recess formed on the inner surface 121B thereof, making it possible to obtain a sheeted dough with a desired form during the forming operation. More particularly, the upper platen 120 comprises a recess 311 formed on the peripheral rim of the surface 121B, in order to produce a crust on the rim of the sheeted dough. By way of non-limitative example, the depth of the peripheral recess 311 is comprised between 4 and 8 mm. A shallower central recess 312 is made on the entire surface situated inside the peripheral recess 311. Preferentially, the depth of the central recess 312 is constant. Alternatively, the depth of the central recess 312 can be variable and irregular in order to simulate the artisanal sheeting of a dough piece. By way of non-limitative example, the depth of the central recess 312 is comprised between 1.5 mm and 3 mm.

Figure 4:
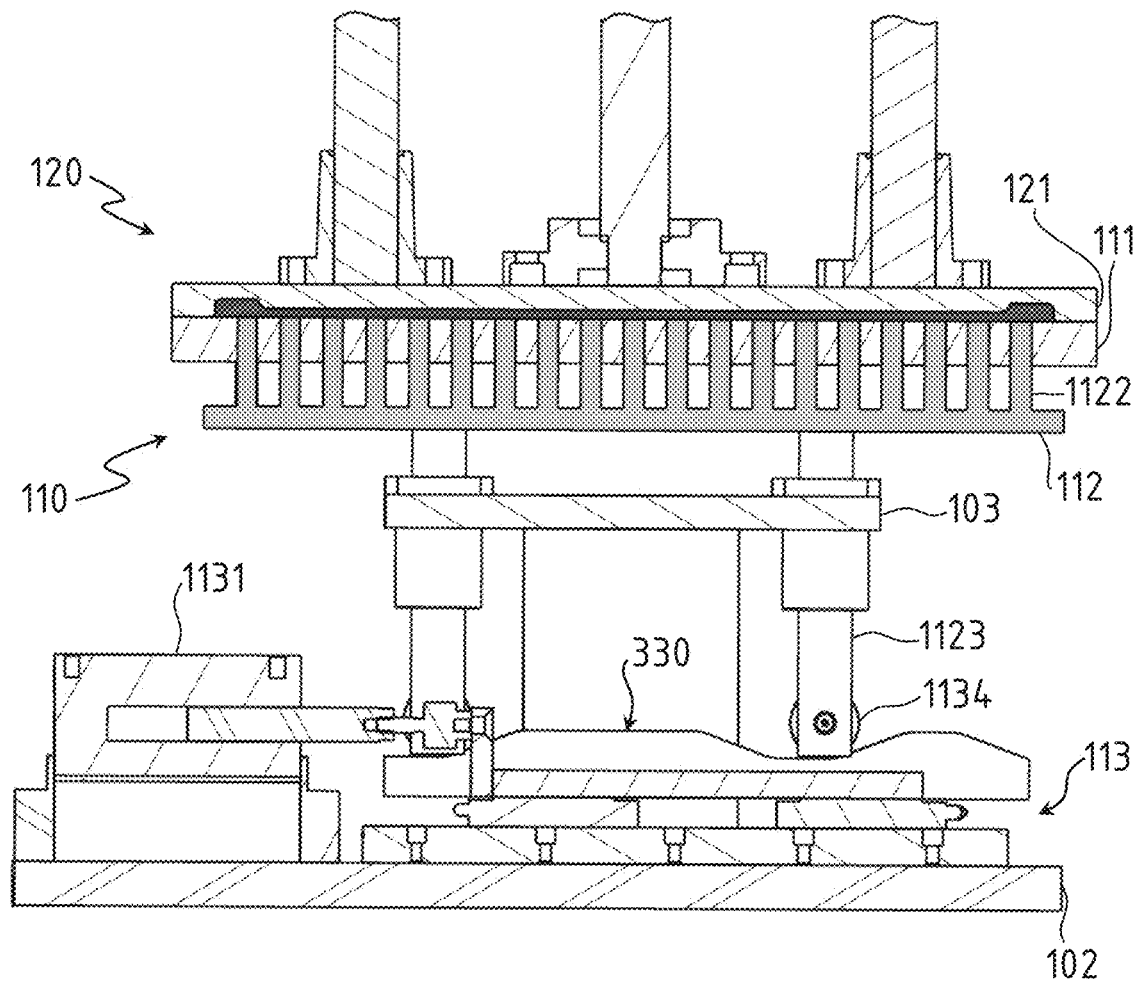

The second step of the forming method is illustrated in FIG. 4. The configuration of the forming device 100 is unchanged from the configuration described in the previous step, apart from in that the upper platen 120 is lowered so that the dough piece 320 is pressed between the surface formed by the pressure plate 111 and the moveable elements 1122 on the one hand, and the upper platen 120 on the other hand. In this way, the dough piece is flattened inside the closed volume comprised between these elements and therefore adopts the corresponding form, occupying both the entire volume of the central recess 312 and the volume of the peripheral recess 311.

Figure 5:
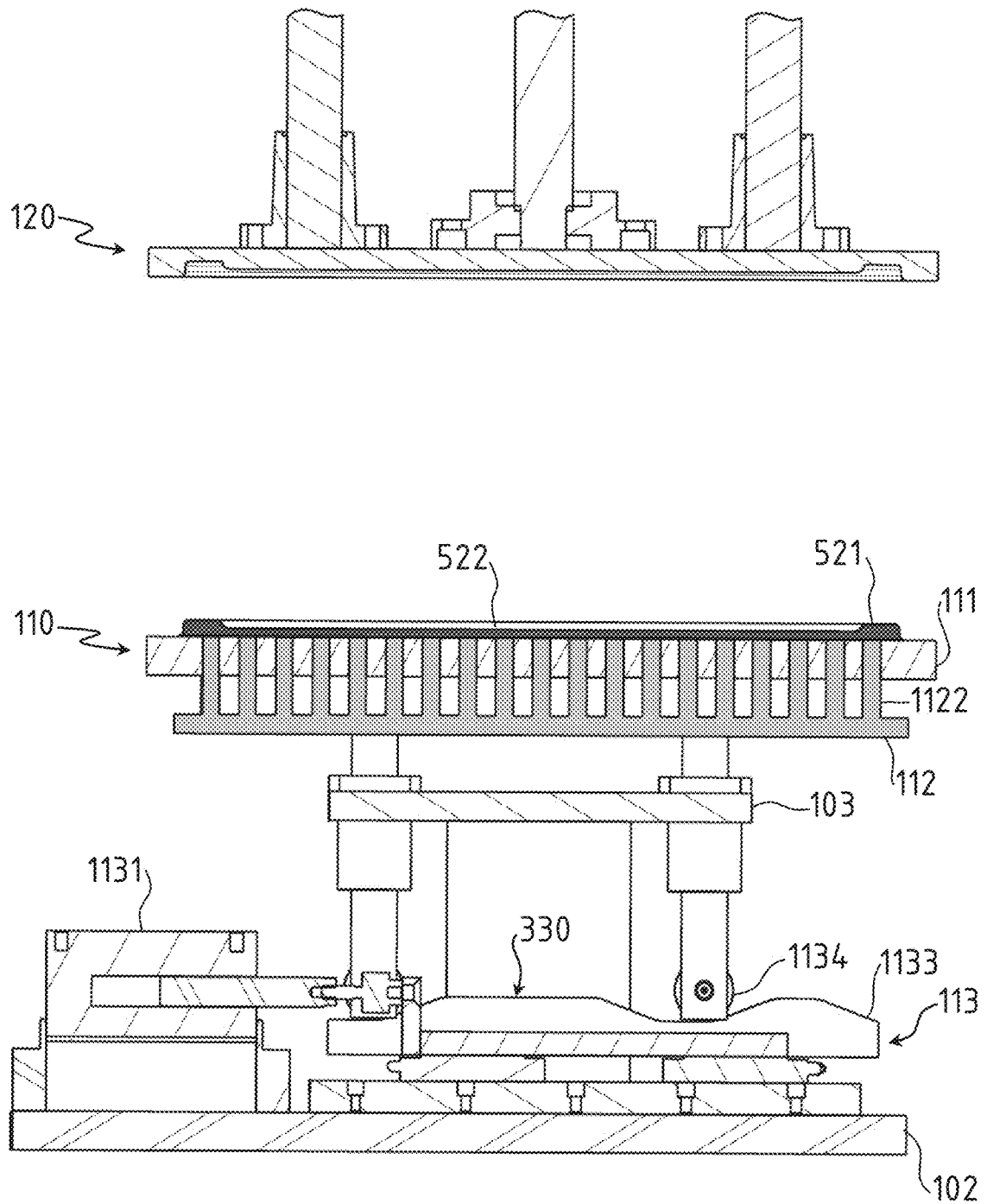

The third step of the forming method is illustrated in FIG. 5. The configuration of the forming device 100 is unchanged with respect to the configuration described in the previous step, apart from in that the upper platen 120 is now raised in such a way as to release the sheeted dough on its upper portion. The sheeted dough has adopted the form of the mould during the previous step and therefore comprises a central portion 522 that is thinner than the peripheral rim 521.

Figure 6:
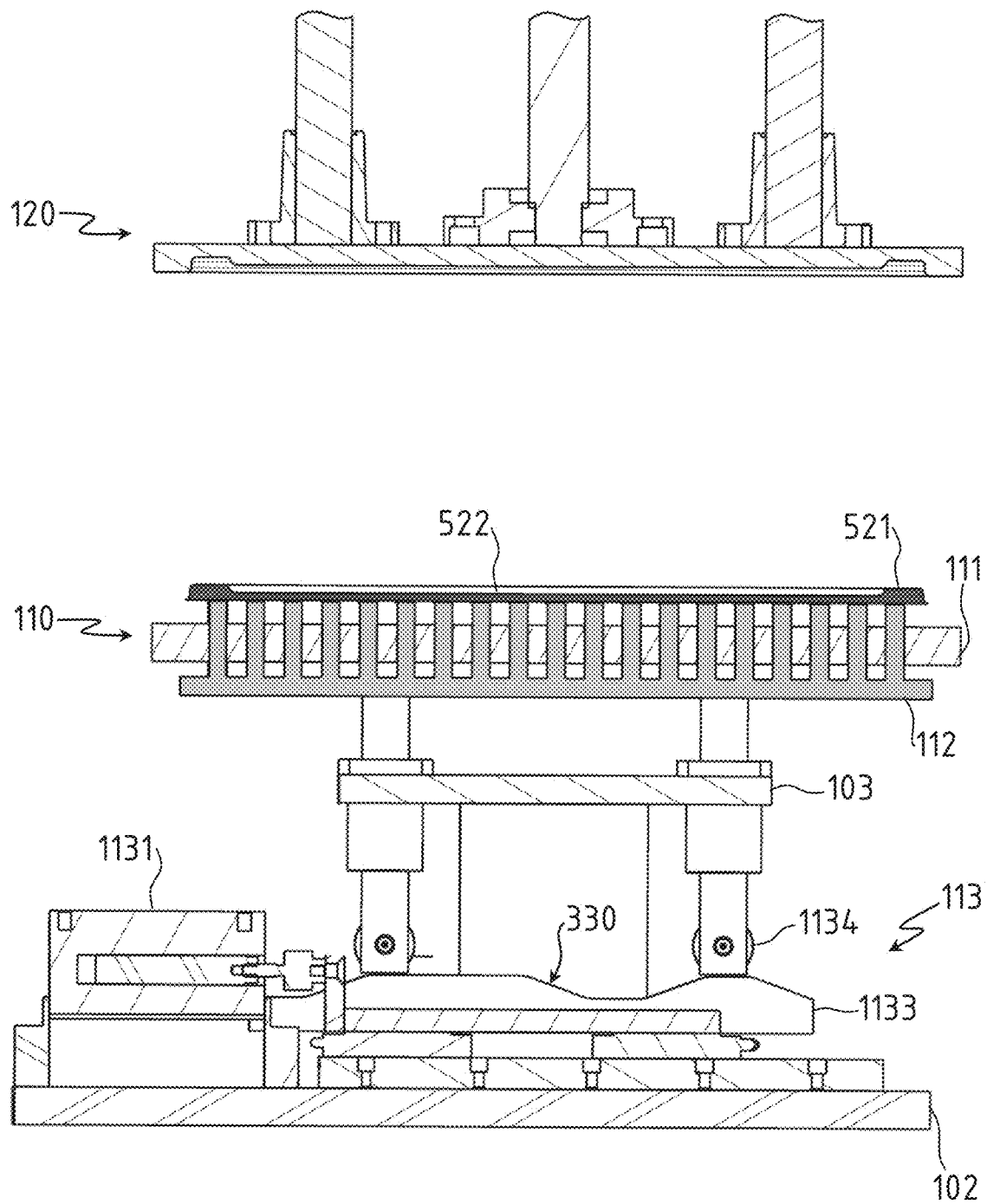

The fourth step of the forming method is illustrated in FIG. 6.

The purpose of this fourth step is to raise the sheeted dough with respect to the pressure plate 111 in such a way that a peel can subsequently be introduced between said pressure plate and the sheeted dough, without touching the latter. To this end, the moveable elements 1122 must therefore be moved to their raised position. The jack 1131 is actuated to position the rollers 1134 on an upper portion of the running surfaces 330.

Optionally, the guide parts 1133 can be arranged in such a way as to define several intermediate configurations of the ejector plate 112. They comprise for example a plurality of horizontal planes situated at different heights and making it possible to define stable positions translating particular heights of the moveable elements above the pressure plate 111.

Figure 7:
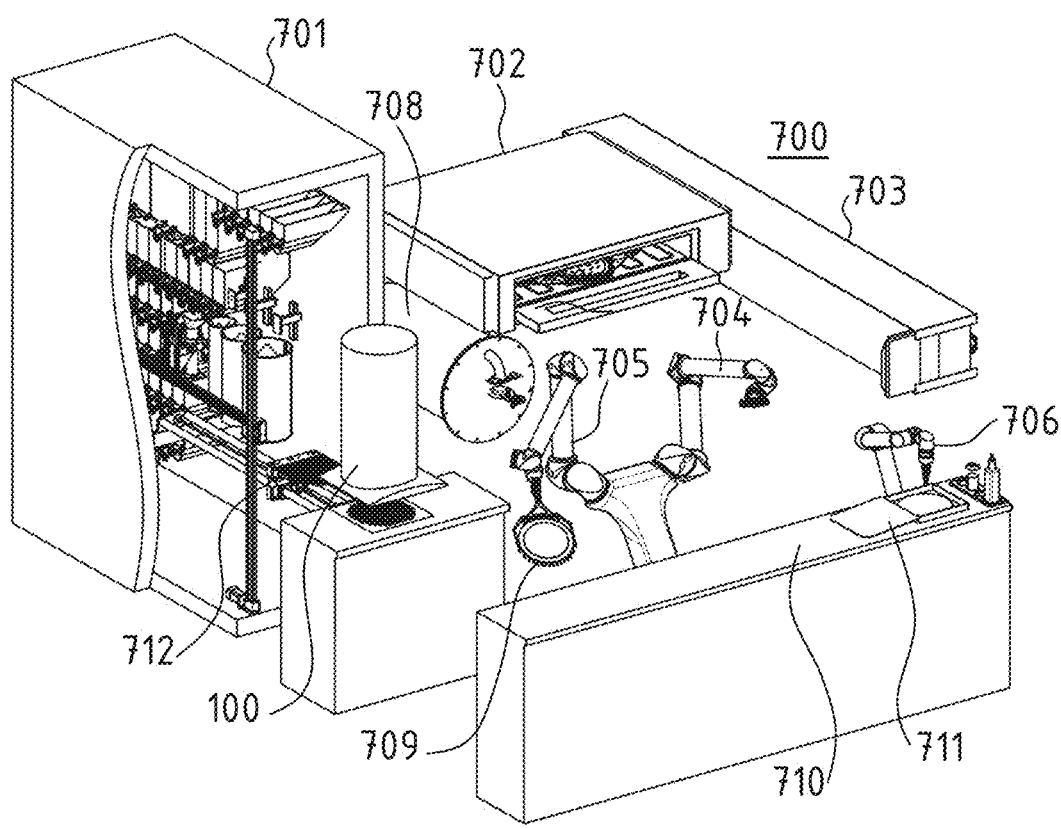
FIG. 7 shows the incorporation of the forming device according to the invention into an automated machine for preparing culinary preparations.

FIG. 7 describes the use of a forming device according to any one of the improvements mentioned above in an automated machine for preparing culinary preparations.

The automated machine for preparing culinary preparations 700 can in particular be arranged to prepare, cook and/or package and/or deliver culinary preparations. It applies in particular to preparing culinary preparations comprising a sheeted dough, and particularly pizzas.

The automated machine for preparing culinary preparations, also known as the automaton 700, comprises:
- a system 701 for preserving and metering ingredients, said ingredients being suitable for use in preparing said culinary preparations;
- a forming device 100 according to any one of the improvements of the present invention;
- an oven 702, arranged so that it can cook the culinary preparations;
- a box dispenser 703;
- a handling system 704-706, arranged so that it can transfer at least one of the made up culinary preparations in particular between the system 701 for preserving and metering ingredients and the oven 702 in particular;
- a processing unit programmed to control said automated machine so as to prepare a culinary preparation according to a predetermined recipe.

For ease of understanding, an example will be given for the preparation of a pizza, but the automated machine is arranged to prepare a wide variety of culinary preparations, as mentioned above.

In the example shown in FIG. 7, the automated machine 700 also comprises a chilled dough tank 708. The handling system implemented comprises in particular three multi-axis robotic arms 704, 705, 706. These robotic arms are arranged to handle the pizza being made, for example by means of a peel 709, and to transfer it from one station to another.

Thus, during a first step, a predetermined quantity of dough, preferably chilled, is extracted from the tank 708 to form a dough piece. This predetermined quantity is sized so that the dough piece can be flattened to the desired dimensions of a pizza dough.

The robotic arm 705 can be equipped with a peel, referred to as a dough peel, to transfer the dough piece to the forming device 100. More precisely, the robotic arm 705 places the dough piece on the lower platen 110. The forming device 100 presses the dough piece to form a sheeted dough by lowering the upper platen 120. The lifting device 113 then places the moveable elements 1122 in the raised position.

The automated machine 700 can also comprise means for placing a sauce (for example tomato- or fresh cream-based) on the sheeted dough.

A conveyor 712 can then be equipped with a peel, for example a comb-shaped peel, to transfer the sheeted pizza dough to the preservation and metering system 701. Said system 701 is arranged to place quantities of ingredients determined according to a given recipe on the surface of the dough.

The robotic arm 705 can then transfer the pizza from the system 701 to the oven 702.

The oven 702 can be arranged to cook a pizza according to a cooking cycle depending on cooking parameters determined according to the recipe selected. The cooking parameters include for example a cooking time and temperature.

The robotic arm 706 can be arranged to extract boxes 711 individually from the box dispenser 703, and place them on a packing station 710.

At the end of the cooking cycle, the door of the oven 702 is opened, and the robotic arm 704 removes the pizza from the oven 702 using a peel. The robotic arm 704 then places the pizza in a box 711 placed on a packing station 710.

The robotic arm 706 can also be arranged to slice the pizza placed in the box 711, and/or season it with condiments.

Of course, the invention is not limited to the examples which have just been described and numerous adjustments can be made to these examples without exceeding the scope of the invention. In particular, the different characteristics, forms, variants and embodiments of the invention can be combined with one another in various combinations to the extent that they are not incompatible or mutually exclusive. In particular all the variants and embodiments described previously can be combined together.

The invention claimed is:

1. A device for forming a sheeted dough from a dough piece, comprising:
   a lower platen, arranged to support the dough piece during a forming operation;
   an upper platen;
   a forming actuator, arranged to generate a relative movement between the upper platen and the lower platen, so that the dough piece can be pressed between the lower platen and the upper platen to form a sheeted dough;
   the lower platen comprises:
      a pressure plate having an upper surface suitable for receiving the dough piece, the pressure plate being equipped with a plurality of apertures formed in the upper surface thereof;
      a plurality of moveable elements, each moveable element engaging with one of the apertures in the pressure plate, the moveable elements being configured to move between two stopped positions, which are:
         a retracted position, in which an upper surface of each moveable element is flush with the upper surface of the pressure plate, in such a way as to form, overall, a continuous surface with the pressure plate, said retracted position being maintained during the pressing operation so that the dough piece is flattened to form a sheeted dough inside a volume defined between the upper platen, and said continuous surface formed by the upper surface of each moveable element and the upper surface of the pressure plate; and
         a raised position, in which the moveable elements protrude with respect to the upper surface of the pressure plate, in such a way that the upper surfaces of each moveable element together form a raised surface with respect to the upper surface of the pressure plate, the moveable elements being moved from the retracted position to the raised position to detach the sheeted dough from the upper surface of the pressure plate so that the sheeted dough is fully supported by said raised surface formed by the upper surfaces of each moveable element together; and
   a lifting device, arranged to move the moveable elements with respect to the pressure plate, in such a way that the moveable elements adopt and maintain the retracted position or the raised position.

2. The device according to claim 1, wherein the sum of the upper surface areas of the moveable elements is comprised of 4% to 96% of the total surface area of the pressure plate.

3. The device according to claim 2, wherein the lifting device comprises a support plate on which the moveable elements are mounted, and an actuator arranged to move the support plate so that the moveable elements can successively adopt the retracted position and the raised position.

4. The device according to claim 1, wherein the upper surfaces of the moveable elements together form a connected surface.

5. The device according to claim 1, wherein the upper surfaces of the moveable elements together form a disconnected surface, each moveable element being evenly spaced from the nearest adjacent moveable element in at least one direction.

6. The device according to claim 1, wherein each moveable element comprises a stud arranged inside one of the apertures of the pressure plate, the studs being capable of being moved in translation along an axis perpendicular to the upper surface of said pressure plate.

7. The device according to claim 6, wherein the lower platen is arranged so that there is clearance between the stud of each moveable element and the corresponding aperture of the pressure plate.

8. The device according to claim 1, further comprising a first heating means arranged to heat the upper platen.

9. The device according to claim 1, further comprising a second heating means arranged to heat the lower platen.

10. The device according to claim 1, wherein at least one of the upper platen and the lower platen comprise a material having a thermal conductivity greater than or equal to 50 W/m·K.

11. The device according to claim 1, wherein at least one of the upper platen and the lower platen comprise a non-stick coating at least on the facing surfaces thereof.

12. The device according to claim 1, further comprising a device for adjusting the size of the sheeted dough, said device comprising:
- storage means arranged to store a plurality of upper platens, each upper platen having on a lower surface thereof a recess of a predetermined size; and
- a loading mechanism arranged to move one of the upper platens between the storage means and a position in which is it attached to the forming actuator.

13. A method of pressing a dough piece to form a sheeted dough, the method comprising:
- pressing the dough piece between an upper platen and a lower platen to form a sheeted dough;
- receiving the dough piece on a pressure plate associated with the lower platen, the pressure plate including a plurality of apertures on an upper surface of the pressure plate;
- providing a plurality of movable elements, wherein each of the movable elements engage one of the apertures on the pressure plate;
- moving each of the movable elements between a first stopped position, which is a retracted position, and a second stopped position, which is a raised position, wherein in the retracted position, an upper surface of each of the movable elements is flush with an upper surface of the pressure plate, and wherein in the raised position, the movable elements protrude from the upper surface of the pressure plate such that the upper surfaces of the each of the moveable elements together form a raised surface relative to the upper surface of the pressure plate; and
- moving the movable elements relative to the pressure plate using a lifting device so that the movable elements are held stationary in the retracted position or in the raised position.

14. An automated machine for preparing at least one pizza, comprising:
- a system for preserving and metering ingredients, said ingredients being suitable for use in preparing pizzas;
- a device for forming a sheeted dough from a dough piece, comprising:
- a lower platen, arranged to support the dough piece during a forming operation; an upper platen;
- a forming actuator, arranged to generate a relative movement between the upper platen and the lower platen, so that the dough piece can be pressed between the lower platen and the upper platen to form a sheeted dough; the lower platen comprises:
- a pressure plate having an upper surface suitable for receiving the dough piece, the pressure plate being equipped with a plurality of apertures formed in the upper surface thereof;
- a plurality of moveable elements, each moveable element engaging with one of the apertures in the pressure plate, the moveable elements being configured to move between two stopped positions, which are:
- a retracted position, in which an upper surface of each moveable element is flush with the upper surface of the pressure plate, in such a way as to form, overall, a continuous surface with the pressure plate, said retracted position being maintained during the pressing operation so that the dough piece is flattened to form a sheeted dough inside a volume defined between the upper platen, and said continuous surface formed by the upper surface of each moveable element and the upper surface of the pressure plate; and a raised position, in which the moveable elements protrude with respect to the upper surface of the pressure plate, in such a way that the upper surfaces of each moveable element together form a raised surface with respect to the upper surface of the pressure plate, the moveable elements being moved from the retracted positon to the raised position to detach the sheeted dough from the upper surface of the pressure plate so that the sheeted dough is fully supported by said raised surface formed by the upper surfaces of each moveable element together; and
- a lifting device, arranged to move the moveable elements with respect to the pressure plate, in such a way that the moveable elements adopt and maintain the retracted position or the raised position;
- an oven, arranged to cook at least one pizza;
- a handling system arranged to transfer at least one of the pizzas between the preservation and metering system, the forming device and the cooking oven; and
- a processing unit programmed to control the automated machine so as to make the at least one pizza according to a predetermined recipe.

* * * * *